United States Patent Office 3,093,767
Patented June 11, 1963

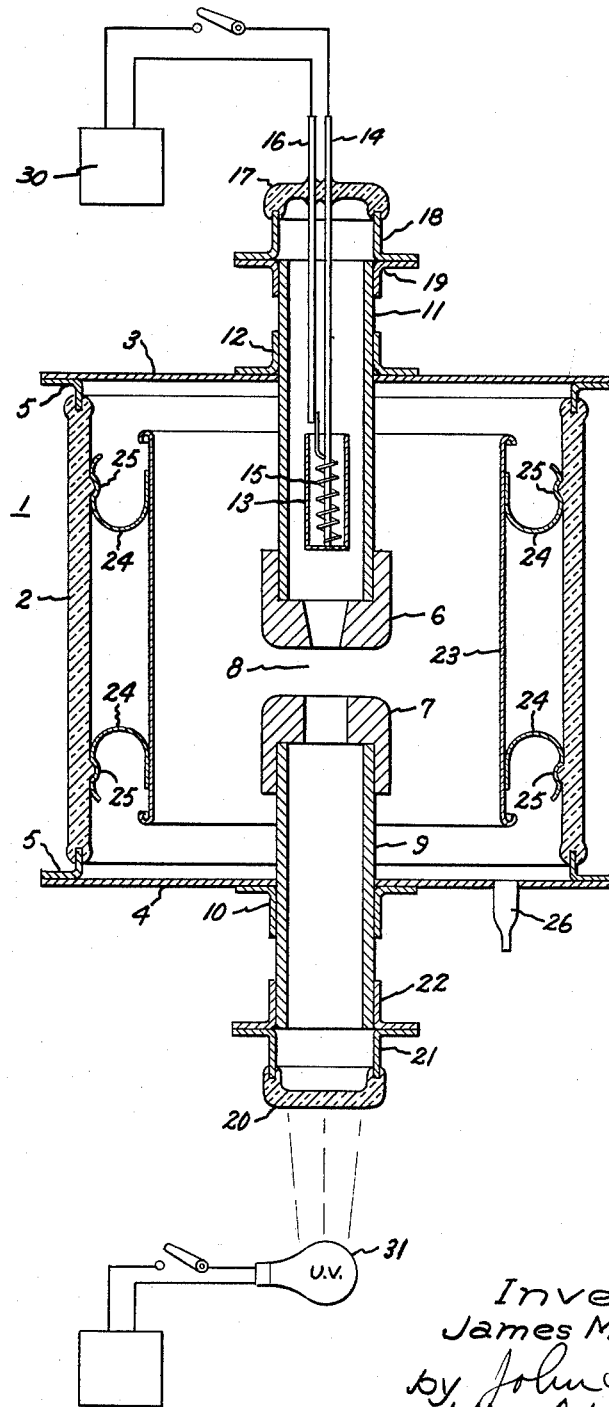

3,093,767
GAS GENERATING SWITCHING TUBE
James M. Lafferty, Schenectady, N.Y., assignor to General Electric Company, a corporation of New York
Filed May 10, 1961, Ser. No. 109,093
6 Claims. (Cl. 313—174)

The present invention relates to electric discharge devices adapted to switch high voltages and currents with speed and precision, and more particularly to such apparatus in which switching is accomplished by triggering electric breakdown between a pair of fixed electrodes separated by a gap.

Gap switching devices are devices which are normally maintained in an open circuit condition but which, when subjected to an appropriate signal, are switched to a closed circuit condition and pass electric current therethrough. Such devices are used to great advantage as overload protectors, lightning arresters, and for the precision switching of extremely high voltages and currents, as for example, in discharging capacitor banks to obtain a very short pulse of extremely high current.

For these uses, gap discharge devices must be able to withstand high voltages and to break down or fire only when desired. They must be adapted, for most applications, to repeatedly fire, often thousands of times, in response to essentially the same breakdown conditions, with the same firing time. In other applications, as for example, when used as lightning arresters, it is imperative that such gap devices have an extremely short recovery time so as to be ready to function again a short time after firing.

Most prior art gap discharge devices are charged with a gaseous atmosphere, often at super-atmospheric pressure. Although suitable for many applications, gaseous gap discharge devices usually have long recovery times, due to the necessity of ionized gases therein becoming deionized before full recovery is effected. Additionally, since the hold-off voltage of a gap discharge device is dependent upon the dielectric strength of the gas therein, gaseous gaps are often quite large when designed for use at high voltages.

Perhaps the greatest disadvantage of gaseous gap discharge devices, however, is due to the fact that with use, gas is removed or "cleaned-up" from the device by entrapment with deposited metallic particles which are evolved from the electrodes of the gap. This "cleanup" changes the characteristic of the gap so that it does not perform reproducibly and, therefore, the device must often be replaced along before actual failure.

Vacuum gap discharge devices have been proposed as a means to overcome many of these disadvantages. In theory, a vacuum gap discharge device would be smaller, due to the high dielectric strength of a vacuum; its recovery time would be much shorter; and, since there is no gas to be removed by sputtered metallic particles, a vacuum gap should not change its operating characteristics. In practice, however, prior art vacuum gap discharge devices have not proven to be reliable, either as to firing voltage, hold-off strength, or recovery time. In prior art vacuum spark gap devices, the operating characteristics seem to be a function of the device's past history, such as the time lapsed since last firing.

It is a general object of the present invention to provide gap discharge devices which overcome one or more of the foregoing disadvantages.

A more specific advantage of the invention is to provide gap discharge devices adapted to reproducibly fire at preselected voltage conditions, and to rapidly recover to the prefiring condition.

Another object of the present invention is to provide gap discharge devices with reproducibly short firing times.

A further object of the invention is to provide improved gap discharge devices having stable, reproducible hold-off voltages, firing times and recovery times.

Still another object of the present invention is to provide improved gap discharge devices which are reliable in operation and which may be readily inexpensively manufactured.

A further object of the invention is to provide gap discharge devices in which electrical switching may be accomplished by a pulse of ultraviolet radiation.

Briefly stated, in accord with my invention, I provide a gap discharge device including an hermetically sealed envelope which is evacuated to a hard vacuum. Within the envelope I provide a pair of closely spaced fixed electrodes fabricated from gas-free metal and defining a gap therebetween. Means are provided in close proximity to said gap for storing a quantity of an ionizable gas which may be released into the vicinity of the gap when desired to provide conditions which, at the voltage applied to the electrodes, brings the device to the threshold of electrical breakdown. Means are further provided to ionize the ionizable gas in response to a pulsed signal at a predetermined time.

In accord with a preferred embodiment of the invention, hydrogen gas is thermally released from a titanium cylinder and is then ionized by a pulse of ultraviolet radiation.

The novel features believed characteristic of the invention are set forth in the appended claims. The invention itself, together with further objects and advantages thereof may best be understood by reference to the following description, taken in connection with the appended drawings in which a device constructed in accord with the invention is shown in a vertical cross-sectional view.

In the drawing, a gap discharge device constructed in accord with the present invention includes an evacuable envelope 1 including an insulating cylindrical side wall 2 and a pair of apertured metallic end plates 3 and 4. End plates 3 and 4 may conveniently be connected to side wall 2 by means of annular flange 5. An apertured cathode electrode 6 and an apertured anode electrode 7 are disposed within envelope 1 in spaced-apart relationship so as to define a breakdown gap 8. Anode electrode 7 is suspended within envelope 1 by means of an anode support cylinder 9 which is passed through an aperture in end plate 4 and hermetically sealed thereto by means of annular flange 10. Cathode electrode 6 is supported within envelope 1 by means of cathode support cylinder 11 which passes through an aperture in end plate 3 and is hermetically sealed thereto by means of annular flange 12. A reservoir for ionizable gas is maintained within hollow cathode support member 11 and may conveniently comprise a titanium cylinder 13 suspended upon a lead member 14. A reservoir heater comprising a coiled helix 15 of resistance wire is located within cylinder 13 and is electrically connected between lead member 14 and lead member 16. Members 14 and 16 are sealed through an insulating cap 17 which is hermetically sealed to the exterior end of cathode support member 11 by a pair of oppositely disposed annular flanges 18 and 19. An ultraviolet transmissive window 20 is located at the outermost end of anode support cylinder 9 and is hermetically sealed thereto by means of a pair of oppositely disposed annular flanges 21 and 22. A shield with furled edges to prevent arcing is disposed within envelope 1 and surrounds electrodes 6 and 7 so as to preclude metal evaporated therefrom from becoming coated over the interior surface of insulating side wall 2, causing a short circuit. Shield 23 is supported within envelope 1 by means of springs 24, which ride upon annular ridges 25 on the interior wall of cylindrical side wall 2. Evacuation of the device may be effectuated through a seal-off conduit 26 which is connected through end wall member 4.

Cylindrical side wall member 2 may be fabricated from any gas-impervious glass or ceramic and may, for example, be made from Pyrex or Vycor glass, or Coors V200 or American Lava T164 ceramics with appropriate seals. Alternatively, aluminum oxide or forsterite ceramic bodies may be utilized. As illustrated in the drawing, a hard glass such as Pyrex is utilized. If ceramic members are used, conventional metal-to-ceramic seals are utilized to form hermetic seals between the metallic and ceramic members. If on the other hand, glasses are used, conventional glass-to-metal sealing techniques, as for example, the sealing of a fernico member into a glass body may be utilized to form hermetic seals.

Electrodes 6 and 7 are fabricated from copper that is substantially free of all non-condensable gaseous impurities or impurities, which upon decomposition may produce non-condensable gases. Such copper should meet a test for gas freedom, the criterion of which is such that when electrodes thereof are placed in a vacuumized test chamber a few liters in volume and subsequently deeply eroded by repetitive arcing, as for example, by a voltage of commercial power at a current of 100 amperes or more, the pressure level in the container, a few cycles after arcing, does not rise substantially from its initial value in the absence of getters and pumps, even when the initial value is $10^{-5}$ mm. of mercury or lower. Analytically this requirement may be stated by the relationship that the contact material must contain less than $10^{-6}$ atomic parts of any non-condensable gases or compounds which dissociate into non-condensable gases.

Electrode support members 9 and 11 need not meet the foregoing stringent requirement, since they are not brought into contact with an electric arc and, therefore, are not potential sources of vacuum-spoiling gases. They should, nevertheless, be of copper which is completely free of oxygen, since in fabrication and operation the device is subjected to hydrogen gas while the elements are maintained at high temperatures and it is undesirable to have oxygen as an impurity and any metal exposed to hydrogen at high temperatures.

End plates 3 and 4 may conveniently be fabricated of stainless steel if glass side walls are utilized. In this instance a fernico is utilized for the glass sealing flanges. Alternatively, if ceramic members are utilized, it may be advisable to use titanium for the end walls and for other metallic members sealed thereto.

In fabrication, the device of the present invention is built as illustrated and, with the titanium reservoir unactivated, the central portion of the device encompassing the electrodes is baked out at temperature approximately 500° C.–600° C. for a suitable time to remove all gaseous impurities therefrom. After baking out, the device is cooled and a hydrogen atmosphere is established therein, preferably by first evacuating to a modest temperature and then flushing with hydrogen for a period of approximately 15–20 minutes to remove all contaminants therefrom. With the hydrogen atmosphere in place, a voltage of sufficient magnitude is connected between members 14 and 16 to cause electric current to flow through reservoir heater 15 and cause titanium cylinder 13 to be heated to a temperature of approximately 900° C. and allowed to cool slowly over a period of an hour to activity getter and absorb a large quantity of hydrogen gas from the atmosphere within envelope 1. After the cylinder has cooled to approximately room temperature, the device is then evacuated through tubulation 26 to a hard vacuum of $10^{-5}$ mm. of mercury pressure or less and preferably to a vacuum of $10^{-6}$ mm. of mercury pressure or less. After evacuation, tubulation 26 is sealed and the device is ready for operation.

In the operation of the device in accord with the present invention, a voltage to be switched or, if the device is to be used as a lightning arrester, the circuit to be protected, is connected between electrode support members 9 and 11. A source of heater voltage 30 is connected between members 14 and 16 for heating titanium reservoir to cause the evolution of hydrogen therefrom. When the device is not in operation, this voltage is disconnected. When, however, the device is to be in operating condition the voltage is connected in a steady state condition and the temperature is regulated to cause the amount of hydrogen evolved from titanium reservoir 13 to be such to establish pressure within envelope 1 which is only slightly below the pressure at which breakdown between electrodes 6 and 7 will occur spontaneously as a result of the electric field due to the potential therebetween. This value may be determined emperically, since it is not only a function of the voltage and the gas pressure but of the electrode spacing and geometry. Thus, for example, for a pair of copper electrodes ⅜" in diameter as illustrated in the drawing and spaced ⅛" apart, the threshold of breakdown is reached, for an anode-cathode potential of 5 kv. at approximately 0.5 mm. of mercury pressure hydrogen.

Once the near-threshold pressure of hydrogen has been established, the device may be rendered conducting instantaneously by a pulse of ultraviolet light passed through window 20 and supplied, for example, by a source of ultraviolet light 31. Upon the transmission of a pulse of ultraviolet light through anode cylinder 9 and through the aperture in anode 7 the gas within the breakdown gap 8 is sufficiently ionized to cause an arc to be established between electrodes 6 and 7 with the conduction of high currents. Current continues between electrodes 6 and 7 as long as a voltage difference exists between these two electrodes. Upon the disappearance of the potential difference between electrodes 6 and 7, the arc is extinguished, the metallic ions which have been evolved from the electrodes rapidly disperse to the electrodes and to shield 23 where they are cooled and deionized. The pressure of hydrogen gas remaining within the breakdown gap returns to the quiescent near-breakdown value and the device is almost instantaneously ready to fire again.

In order that devices constructed in accord with the present invention be properly able to recover from a conducting to a non-conducting condition, it is essential that the pressure within the device be maintained at the indicated pressure of $10^{-5}$ mm. of mercury or less. This is because the presence of any gas sufficient to cause a higher pressure will cause sufficient ionizable gaseous items to be present within the device so that upon firing of the device, a residual ionization will occur which, upon deactivation of the device, must disappear. The time required for this residual ionization to disappear seriously detracts from the ability of the device to recover full hold-off strength in a short time and would cause the device to have a long recovery time. Accordingly, it is essential in the operation of this device that, prior to the activation of the hydrogen reservoir to cause evolution of hydrogen gas that there be no residual gas. It is for this same reason that gas-free copper electrodes are utilized so that there will be no evolution of residual gases during operation.

The devices of the present invention are ideally suited for the switching of high voltage, high current loads with microsecond speeds which are reproducible with only a slight error. Additionally, the devices in accord with the present invention exhibit fast recovery times to high dielectric strength. The speed and accuracy exhibited by the device in accord with the present invention are highly desirable, particularly in applications where it is desirable to simultaneously fire or discharge a number of capacitors to achieve a high current, high voltage discharge. Likewise, they are of great advantage when it is necessary to cause the rapid recovery of an electrical system, as for example, in lightning arrester applications.

Furthermore, the devices of the present invention are particularly advantageous as compared with gaseous gap devices in that, since there is no residual gas which can be cleaned up by sputtering or evaporation of material from the cathode, there is no change in the operating parameters during the life of the devices as a result of such gaseous cleanup. Additionally, the devices constructed in accord with the present invention are, unlike prior art vacuum devices, quite reliable and operate with reproducible parameters.

While the invention has been set forth herein with respect with certain embodiments thereof, many modifications and changes will readily occur to those skilled in the art. Accordingly, I intended by the appended claims to cover all such modifications and changes that will fall within the true spirit and scope of the invention.

What I claim as new and desire to secure by Letters Patent of the United States is:

1. An electric discharge device adapted to change from a non-conducting state to a conducting state with the application of a pulsed signal thereto and comprising: an hermetically sealed envelope evacuated to a pressure of $10^{-5}$ mm. of mercury or less; a cathode electrode and an anode electrode located within said envelope and spaced apart from each other to define a breakdown gap therebetween; means located in close juxtaposition to said gap for storing, under conditions consistent with the maintenance of a hard vacuum, a quantity of an ionizable gas; means for evolving said gas from said storage means at a predetermined signal to render said breakdown gap at near-breakdown conditions; and means for delivering a pulse of ionizing radiation to said gap to render said gap conducting.

2. An electric discharge device adapted to change from a non-conducting state to a conducting state with the application of a pulsed signal thereto and comprising: an hermetically sealed envelope evacuated to a pressure of $10^{-5}$ mm. of mercury or less; a cathode electrode and an anode electrode located within said envelope and spaced apart from each other to define a breakdown gap therebetween; means located in close juxtaposition to said gap for storing under conditions consistent with the maintenance of a hard vacuum, a quantity of an ionizable gas; means for thermally evolving said gas from said storage means at a predetermined signal to render said breakdown gap at near-breakdown conditions; and means for delivering a pulse of ionizing radiation to said gap to render said gap conducting.

3. An electric discharge device adapted to change from a non-conducting state to a conducting state with the application of a pulsed signal thereto and comprising: an hermetically sealed envelope evacuated to a pressure of $10^{-5}$ mm. of mercury or less; a cathode electrode and an anode electrode located within said envelope and spaced apart from each other to define a breakdown gap therebetween; means located in close juxtaposition to said gap for storing, under conditions consistent with the maintenance of a hard vacuum, a quantity of an ionizable gas; means for thermally evolving said gas from said storage means at a predetermined signal to render said breakdown gap at near-breakdown conditions; and means for delivering a pulse of ultraviolet radiation to said gap to render said gap conducting.

4. An electric discharge device adapted to change from a non-conducting state to a conducting state with the application of a pulsed signal thereto and comprising: an hermetically sealed envelope evacuated to a pressure of $10^{-5}$ mm. of mercury or less; apertured cathode and anode electrodes located within said envelope and spaced apart from each other to define a breakdown gap therebetween; means located adjacent one of said cathode and anode electrodes for storing, under conditions consistent with the maintenance of a hard vacuum, a quantity of an ionizable gas; means for evolving said gas from said storage means and through said one electrode into said gap at a predetermined signal to render said gap at near-breakdown conditions; and means for delivering a pulse of ionizing radiation to said gap to render said gap conducting.

5. An electric discharge device adapted to change from a non-conducting state to a conducting state with the application of a pulsed signal thereto and comprising: an hermetically sealed envelope evacuated to a pressure of $10^{-5}$ mm. of mercury or less; an apertured cathode electrode and an anode electrode located within said envelope and spaced apart from each other to define a breakdown gap therebetween; ionizable gas storage means located in close juxtaposition to said gap and accessible thereto through the aperture in said cathode electrode for storing, under conditions consistent with the maintenance of a hard vacuum, a quantity of ionizable gas; means for thermally evolving said gas from said storage means at a predetermined signal to render said breakdown gap at near-breakdown conditions; and means for delivering a pulse of ultraviolet radiation to said gap to render said gap conducting.

6. An electric discharge device adapted to change from a non-conducting state with the application of a pulsed signal thereto and comprising: an hermetically sealed envelope evacuated to a pressure of $10^{-5}$ mm. of mercury or less; an apertured cathode electrode supported upon a cylindrical cathode electrode support member and an apertured anode electrode supported upon a cylindrical anode electrode support member, said electrodes located within said envelope and spaced apart from each other to define a breakdown gap therebetween; a titanium member located within said cathode electrode support cylinder in close juxtaposition with said gap for storing a quantity of hydrogen gas; heater means associated with said titanium member for heating said titanium member during fabrication to cause gettering of hydrogen gas thereby and for heating said member during operation to cause thermal evolution of said gettered hydrogen from said titanium member at a predetermined signal to render said breakdown gap at near-breakdown conditions; and means for delivering through said apertured anode electrode a pulse of ultraviolet radiation to the vicinity of said gap to render said gap conducting.

References Cited in the file of this patent

UNITED STATES PATENTS

| | | |
|---|---|---|
| 2,708,247 | Bell | May 10, 1955 |
| 2,898,502 | Beck et al. | Aug. 4, 1959 |